Dec. 29, 1931.    J. SEEGELKEN    1,839,055
NOVELTY LIGHT FOR RADIATORS
Filed Jan. 10, 1931    2 Sheets-Sheet 1
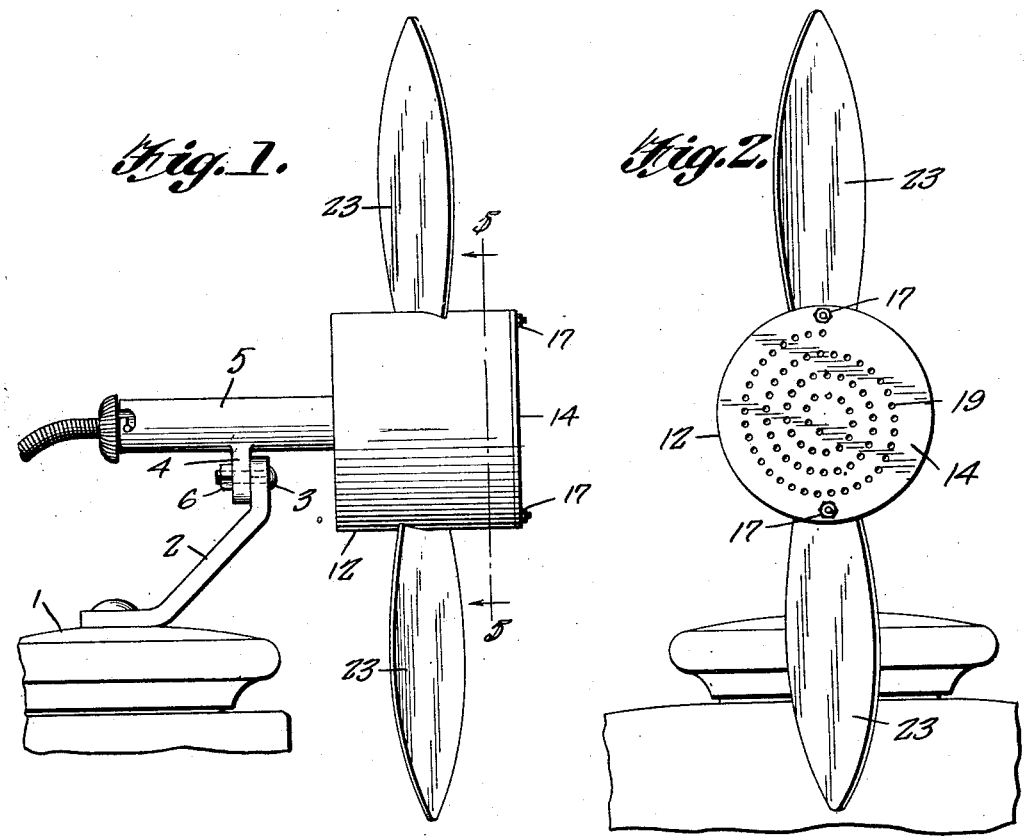
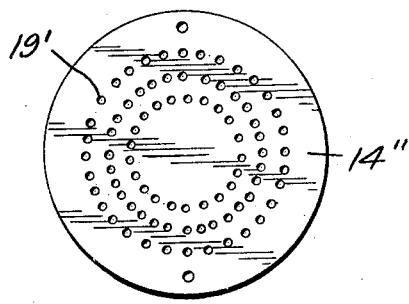
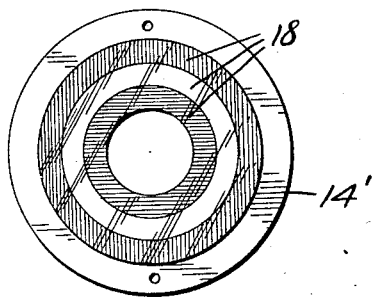
John Seegelken, INVENTOR Dec. 29, 1931.   J. SEEGELKEN   1,839,055
NOVELTY LIGHT FOR RADIATORS
Filed Jan. 10, 1931   2 Sheets-Sheet 2
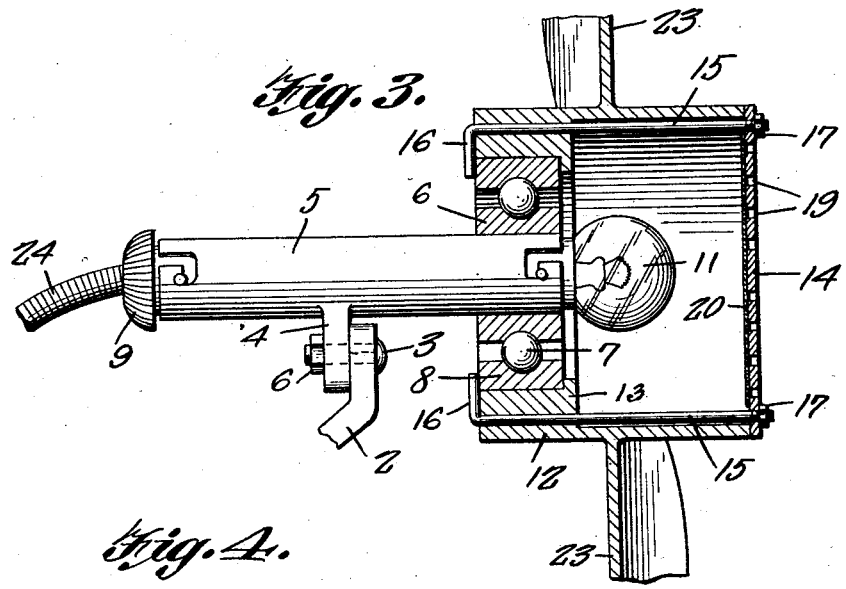
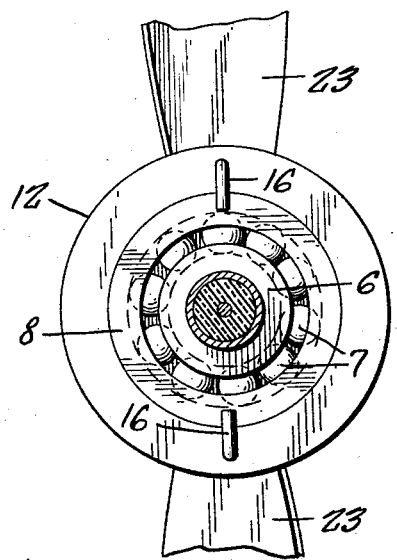
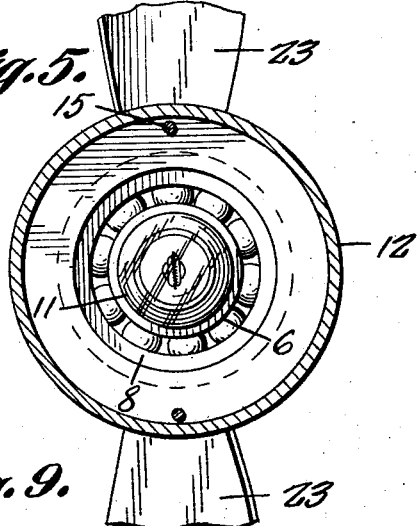
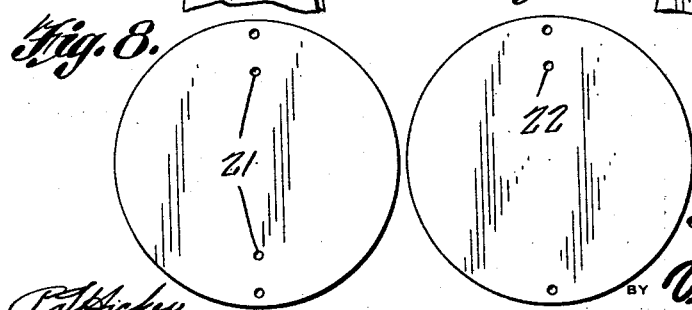

Patented Dec. 29, 1931

1,839,055

UNITED STATES PATENT OFFICE

JOHN SEEGELKEN, OF SANTA ROSA, CALIFORNIA

NOVELTY LIGHT FOR RADIATORS

Application filed January 10, 1931. Serial No. 507,972.

The object of this invention is the provision of an illuminated decoration for the radiator caps of automobiles.

A further object is the provision of a radiator cap ornament that is revolved by a force of air contacting therewith and which has arranged therein a lamp whose rays of light are emitted in a beam or in differently colored beams through the front of the ornament to produce a novel lighting effect which is pleasing to the eye and which is also in the nature of a safety device inasmuch as they cannot fail but attract attention to the automobile equipped therewith.

A further object is the provision of an ornamental attachment for the caps of radiators of automobiles in which a hollow hub is provided with outstanding fan blades, the hub being journaled on anti-friction bearings supported by a tube or socket which is attached to the radiator cap and through which tube or socket there is directed the conductor wires for a lamp bulb that is arranged in the hub, the outer face of the hub being open but being provided with a closure disc formed or provided with apertures or openings which may be staggeredly, circumferentially or spirally arranged and being covered by translucent elements which may be variously colored, together with means for holding the face plate on the hub, which means also holds the anti-friction bearings in the hub, and whereby when the hub is turned by the force of air directed against the blades, the light beams emitted through the apertures or openings will be variously colored to provide a lighting effect which cannot fail but draw attention to the vehicle.

To the attainment of the foregoing the invention consists in the improvement hereinafter described and definitely claimed.

In the drawings:

Figure 1 is a side elevation of the improvement in applied position.

Figure 2 is a face view thereof.

Figure 3 is a side elevation of a somewhat enlarged scale with parts in section.

Figure 4 is a rear elevation thereof.

Figure 5 is a sectional view approximately on the line 5—5 of Figure 1.

Figures 6 to 9 illustrate different face plates or discs for the hub.

In carrying out my invention I fix to the top of the cap 1 for the radiator of an automobile one of the straight ends of an angle bracket 2, the second and upwardly directed end of the angle bracket having passed therethrough the squared portion of the shank adjacent to the head of a bolt 3. The squared portion of the shank may also pass through an ear 4 that depends from a tubular member in the nature of a socket 5. The bolt 3 is engaged by a nut 6.

The socket 5 is of a determined length and has its outer end received through an annular bearing member 6. The bearing member is fixedly secured to the socket and has its outer periphery centrally grooved to provide one of the elements of a raceway for anti-friction balls 7. The second and outer bearing section is indicated by the numeral 8 and is in the nature of an annular or ring member that has its inner periphery centrally formed with a continuous groove that provides the second element of the raceway for the balls 7. The bearing 8 revolves around the bearing 6.

The ends of the socket 5 are provided with key hole openings for pins on the base portions of a plug 9 and a lamp bulb 11, respectively, the lamp bulb being removably secured in the outer end of the socket, and the plug carries connecting wires which lead from the electric system of the automobile and which are directed through the socket and connected to the base of the bulb 11.

The hub of the improvement is round in plan and is indicated in the drawings by the numeral 12. The hub has an inner thickened portion for the reception of the bearing 8, the said thickened portion at its inner end being formed with an annular flange 13 to contact with the surface of the said bearing. The hub is of any desired length and the outer and open end thereof is closed by a disc 14. The face plate or disc 14 is held on the hub through the medium of bolts on rods 15 which are passed through openings in the inwardly thickened portions of the hub and through openings in the face plate or disc 14. The rods 15 have angle ends 16 designed to be arranged against the inner face of the hub and against the bearing 8, and if desired, these angle ends may be received in depressions in the said hub and bearing. The outer ends of the rods are threaded and have screwed thereon bolts 17 which, of course, contact with the face of the plate 14. As disclosed by Figure 6 of the drawings the disc or face plate 14 may be constructed of a plurality of ring sections arranged one in the other and suitably connected, and certain of these rings, indicated for distinction by the numeral 18 are translucent and differently colored. As shown in Figure 7 the face plate 14″ may be provided with series of annular apertures 19′ and as shown by Figure 3 of the drawings the face plate may have arranged upon its inner face a celluloid or like translucent disc 20 to cover the apertures and the said disc is painted with different colors so that such colors will appear opposite the apertures 19. In Figure 8 the metal disc may be provided with two oppositely disposed apertures 21, while, as shown in Figure 9 the disc or face plate may be provided with a single aperture 22. In the showing of both Figures 8 and 9 the apertures are covered by translucent plates which in Figure 8 are differently colored.

The hub 12 has formed therewith and projecting therefrom blades 23, and the said blades, being contracted by air currents, will revolve and cause the turning of the hub 12. The conductors for the electric current are, of course, controlled by a suitable switch, not shown, so that the bulb 11 need be illuminated only in the night time. It will be apparent that the rays of light will be directed through the colored openings in the face plate 14, a ray of light being directed through each of the said openings, and the intermixing and differently colored beams of light thus projected through the hub will have a pleasing effect and cannot fail to attract attention to the car equipped with the improvement. The improvement is essentially in the nature of a novelty but the same also serves as an effective means for preventing collisions and other accidents as the colored soft beams of light directed through the device will serve as a warning to pedestrians and operators of vehicles of the approach of the vehicle provided with the improvement.

Having described the invention, I claim:

A radiator cap light comprising a bracket, a socket member carried by the bracket, a bearing member mounted upon the socket, a second bearing member surrounding the first-mentioned bearing member, anti-friction bearing elements interposed between said bearing members, a hub having an interiorly located flange engaging one of said bearing members, blades mounted upon the hub, a transparent plate closing one end of the hub, a perforated disc applied over said plate, and bolts passing through the disc and through the hub and having angularly disposed end portions engaging the face of one of the bearing members.

In testimony whereof I affix my signature.

JOHN SEEGELKEN.